United States Patent [19]

Kittridge et al.

[11] Patent Number: 4,892,401
[45] Date of Patent: Jan. 9, 1990

[54] AUXILIARY SIDE VIEW MIRROR MODULE

[76] Inventors: John H. Kittridge; Suzanne Nellett, both of 1063 Genella St., Pontiac, Mich. 48054

[21] Appl. No.: 321,873

[22] Filed: Mar. 10, 1989

[51] Int. Cl.⁴ .............................................. G02B 5/10
[52] U.S. Cl. .................................... 350/626; 350/632; 350/639
[58] Field of Search ............... 350/606, 631, 632, 639, 350/626

[56] References Cited

U.S. PATENT DOCUMENTS

| | | | |
|---|---|---|---|
| 3,954,328 | 5/1976 | Ames | 350/639 |
| 4,111,532 | 9/1978 | Budish | 350/307 |
| 4,504,118 | 3/1985 | Harig | 350/626 |
| 4,598,982 | 7/1986 | Levine | 350/639 |
| 4,750,824 | 6/1988 | Soumenis | 350/606 |

Primary Examiner—Bruce Y. Arnold
Assistant Examiner—J. Patrick Ryan
Attorney, Agent, or Firm—Krass and Young

[57] ABSTRACT

An auxiliary mirror module for extending the viewing area of an existing side view mirror of the type mounted in a housing is disclosed. The module comprises a casing configured to slidably fit over at least a portion of the housing, the casing including a pair of opposed channel sections. The casing is supported on the housing by sliding the channel sections over opposed edges of the housing. The module includes an auxiliary mirror supported alongside and co-planar with the side view mirror. The casing further includes a threaded fastener for engaging a support bracket to retain the casing relative to the mirror. Retaining structure for securing the module to the housing support is also disclosed.

9 Claims, 1 Drawing Sheet

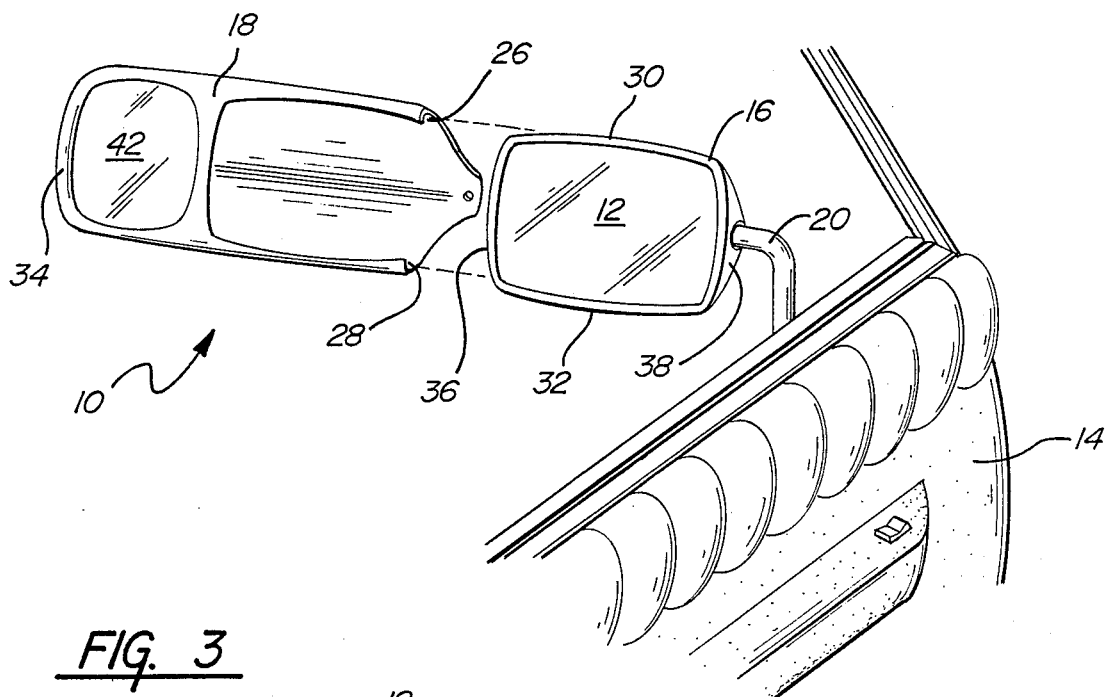
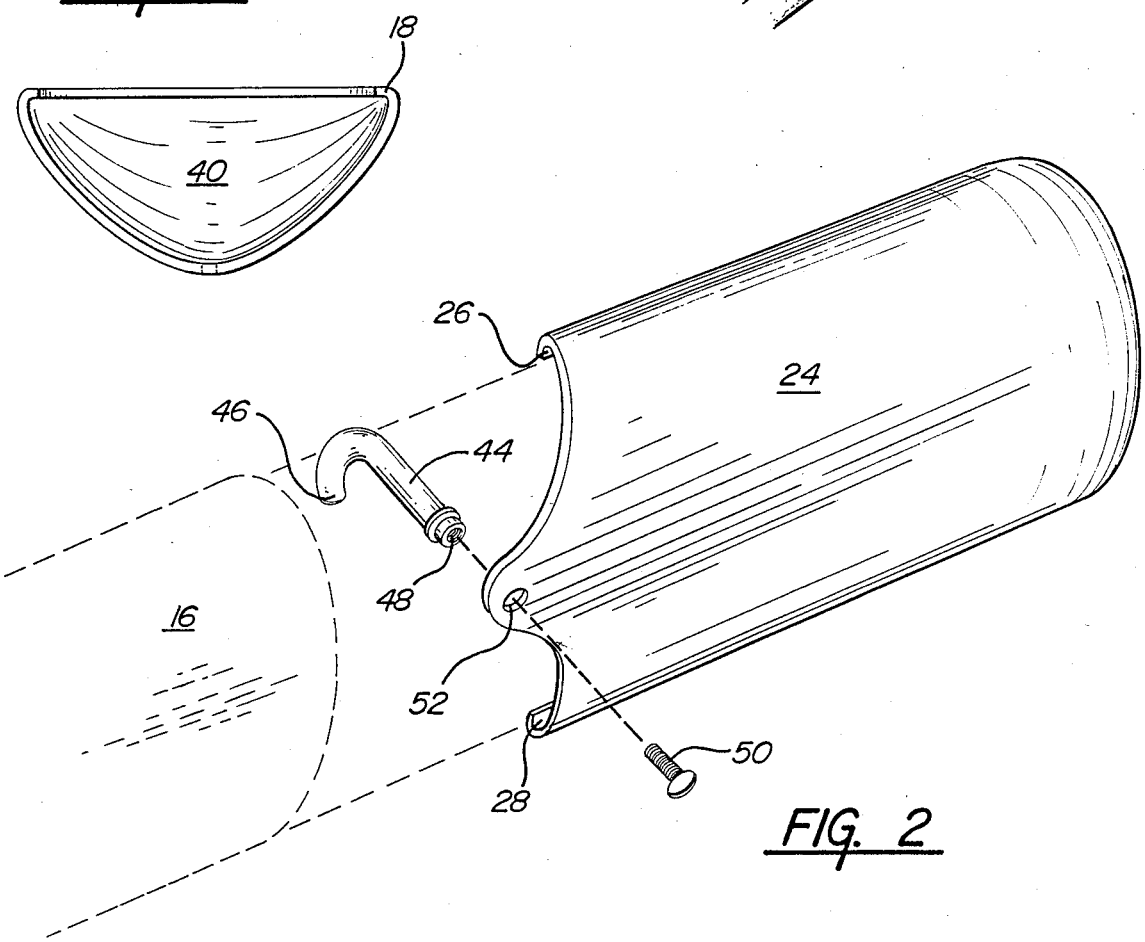

AUXILIARY SIDE VIEW MIRROR MODULE

BACKGROUND OF THE INVENTION

1. Field of the Invention

The present invention relates to automotive side view mirrors and, more particularly, to an auxiliary mirror adapted to be removably attached to the housing of the side view mirror for extending the viewing area of the side view mirror.

2. Description of the Related Art

Most automotive vehicles today have side view mirrors mounted on the exterior of the front doors for enabling the driver to see vehicles approaching from the rear. These side view mirrors, although adequate in most instances, fail to reflect vehicles in what is commonly referred to as "blind spots" located near the rear end of the vehicle. These blind spots can hide other vehicles from the view of the driver, resulting in a collision when the driver changes lanes without turning to see if other vehicles are in the adjacent lane.

The problem is specially acute when the vehicle is towing a trailer, a boat, a camper or the like. The side view mirrors on the vehicle are not large enough or spaced far enough away from the vehicle to show the entire blind spots back to the trailer being towed. For this reason, temporary side view mirrors extending further outwardly from the side of the car have been utilized. Typically, temporary side view mirrors are removably mounted onto the front fenders or the front door frames of the automobile by a series of mounting clamps or straps. Side view mirrors of this type are subject to extreme vibrations from the road, causing them to be loosened and consequently, displaced so as to be useless to the driver. These mirrors often scratch or wear the vehicle surface where the mounting clamps attach to the vehicle.

Other temporary side view mirrors have been proposed. For example, Pat. No. 4,111,532 discloses a temporary side view mirror for vehicles removably mounted onto an existing side view mirror. The additional mirror is attached to a mounting fitted over the existing mirror. An arm extending laterally outwardly from the mounting secures the additional mirror to the mounting increasing the vehicle operator's field of view. However, this mounting mechanism completely covers the existing side view mirror, forcing the driver to rely solely on the additional mirror while driving. Also, the weight of the additional mirror extending outwardly and supported by the arm may break if struck by flying objects, such as stones, or by the inadvertent bumping of the mirror against stationary objects.

Pat. No. 4,504,118 discloses another vehicle mirror for enlarging the viewing area of a side view mirror of tractor trailers. This auxiliary mirror helps the driver of the tractor-trailer in backing up while turning sharply or during a sharp turn on the roadway. The auxiliary mirror includes a pair of upper and lower brackets fixed directly to the existing side view mirror. The brackets extend outwardly for receiving the auxiliary mirror that provides the extra viewing along another path of sight. Other components, including support brackets, frame means, gaskets and connectors complete the auxiliary side view mirror. The number of component parts makes this mirror difficult to remove and reattach to a vehicle.

SUMMARY OF THE INVENTION

There is a need for an auxiliary mirror module for extending the viewing area of an automobile side view mirror adapted to attach to the side view mirror simply and quickly in such a way that is not easily broken by flying objects.

The present invention is directed toward an auxiliary mirror module for use with an automotive side view mirror of the type mounted in a housing. The housing is mounted on a support bracket configured to be attached to the exterior of a vehicle. The module comprises an elongated, planar casing configured to be slidably fit over at least a portion of the housing.

The module further comprises a pair of opposed channel sections supported on the casing. The channel sections are separated by distance substantially equal to a dimension between opposed edges of the side view mirror housing so that the casing may be supported on the housing by sliding the channel sections over the opposed edges of the housing. One of the ends of the casing extends laterally outwardly from the vehicle.

An auxiliary mirror is supported on the casing at the laterally extending end of the casing. The auxiliary mirror is supported alongside and substantially coplanar with the side view mirror when the casing is supported on the mirror housing.

The module further comprises a threaded fastener supported on the casing adapted to engage the side view mirror support bracket and retain the casing relative to the side view mirror housing.

The threaded fastener includes an elongated member having a hook-shaped end configured to engage the housing support bracket and also includes means for securing the fastener and casing to the support bracket, such as a male threaded rod adapted to engage a female threaded portion of the fastener. The male threaded fastener projects through and communicates with the casing to matingly engage the female threaded portion of the elongated member to securely attach the casing to the housing support bracket. Other similar threaded rod fasteners may be suitably employed in securing the casing to the housing support bracket.

These and other advantages of the invention will be readily apparent from the following detailed description of a preferred embodiment of the invention.

BRIEF DESCRIPTION OF THE DRAWINGS

FIG. 1 is an exploded view of an auxiliary mirror module as it mounts onto an automobile side view mirror;

FIG. 2 is an exploded rear elevational view of the mirror module of FIG. 1; and

FIG. 3 is an end view of the module of FIG. 2.

DETAILED DESCRIPTION OF THE INVENTION

Referring to the drawings, an auxiliary mirror module, generally indicated at 10, representing a preferred embodiment of my invention, is adapted to be mounted over a conventional side view mirror 12 of a vehicle 14. The side view mirror 12 is mounted in a housing 16 secured to a support bracket 20 which is attached to the exterior of vehicle 14. FIG. 1 illustrates module 10 as it slidably fits onto side view mirror 12 on the left vehicle door, but module 10 may also be fabricated to fit over a side view mirror on the right side of the vehicle.

Auxiliary mirror module 10 comprises an elongated planar casing 18 adapted to slidably fit over housing 16 of side view mirror 12. In the preferred embodiment, casing 18 fits entirely over housing 16, but alternatively, casing 18 may slide over only a portion of housing 16. Casing 18 may be fabricated from any one of a variety of materials including metals or synthetic polymeric materials.

In the preferred embodiment, auxiliary module 10 exposes substantially all of side view mirror 12 so that a driver can use side view mirror 12 while driving. Alternatively, module 10 may be configured to expose only a portion of side view mirror 12.

Module 10 further comprises a pair of opposed channel sections 26,28 supported on opposed edges of casing 18. Channel sections 26,28 are separated by a distance substantially equal to a dimension between opposed edges 30,32 of the side view mirror housing 16. In this manner, casing 18 may be supported on housing 16 by horizontally sliding the channel sections 26,28 over opposed edge 30,32 of housing 16 so that the end 34 of casing 18 extends laterally outward from the vehicle 14. Alternatively, channel section 26,28 may be formed to slidably engage opposed vertical edges 36,38 of housing 16 so that casing 18 is vertically, slidably received over housing 16.

Referring now to FIG. 3, there is shown an end view of module 10 as it slidably fits over housing 16 as in FIG. 2. As illustrated, casing 18 is substantially hollow and defines a chamber 40 for receiving housing 16 of side view mirror 12 therein. In the preferred embodiment, chamber 40 extends in casing 18 a distance sufficient to completely encase the rear side of housing 16, but alternatively, chamber 40 may extend completely through module 10 to decrease the weight of module 10.

Module 10 further includes an auxiliary mirror 42 supported on casing 18 at a laterally extending end 34. Auxiliary mirror 42 is supported alongside and substantially coplanar with side view mirror 12 when casing 18 is secured over housing 16. Auxiliary mirror 42 may be secured to casing 18 in any one of a variety of ways including adhesive bonding, threaded fasteners and the like. Alternatively, casing 18 may define down-turned edges surrounding auxiliary mirror 42 at the outward end 34 for receiving and securing auxiliary mirror 42. Auxiliary mirror 42 may also be pivotally mounted in casing 18 to adjustably extend the viewing area of module 10.

Casing 18 is secured to housing support bracket 20 by a threaded fastener 44 as shown in FIG. 2. Threaded fastener 44 has a hook-shaped end 46 and a substantially hollow opposite end 48. The hook-shaped end 46 is configured to engage housing support bracket 20 which, in the illustrated embodiment, is a tubular rod. Support bracket 20 may be configured in a variety of other shapes and fastener 44 may be fabricated in corresponding shapes to accommodate those configurations. The hollow end 48 is female threaded for receiving a male threaded rod 50. Male threaded rod 50 projects through and communicates with casing 18 through hole 52 in casing 18. In the preferred embodiment, male threaded rod 50 is flush with rear face 24 of casing 18 to further reduce wind resistance produced by module 10. Alternatively, the threaded fastener 44 may include a hook-shaped end for engaging the housing support bracket 20 and a substantially solid opposite end having a male threaded portion. The male threaded portion projects through hole 52 in casing 18 and is matingly engagable with a female threaded fastener nut, such as a wing nut or the like, for securing the casing to the housing support bracket 20. In this manner, auxiliary mirror module 10 is quickly and easily mounted and removed from the side view mirror 12.

In light of the foregoing, it should be apparent that many variations are possible within the scope of the present invention. For example, the threaded fastener may be one of a variety of different threaded rod fasteners, for example, a U-shaped channel bracket may be used for housing support bracket configurations that are square. The above-described embodiments may be used on a variety of different automotive vehicles as well. Accordingly, the foregoing drawings, discussion and description are merely meant to be illustrative of particular embodiments of the invention and not limitations upon the practice thereof. It is the following claims including all equivalents which define the scope of the invention.

We claim:

1. An auxiliary mirror module for extending the viewing area of an automotive side view mirror of the type mounted in a housing, said housing being mounted on a support bracket configured to be attached to the exterior of a vehicle, said module comprising:

an elongated planar casing;
a pair of opposed channel sections supported on the casing, said channel sections being separated by a distance substantially equal to a dimension between opposed edges of the side view mirror housing so that the casing may be supported on said housing by sliding the channel sections over said opposed edges of the housing so that one of the ends of the casing extends laterally outward from the vehicle;
an auxiliary mirror supported on the casing at said laterally extending end so as to be supported alongside and substantially co-planar with the side view mirror housing; and
a threaded fastener supported on the casing at a location removed from said channels and adapted to engage said side view mirror support bracket to retain the casing relative to the side view mirror housing.

2. The auxiliary mirror module of claim 1, wherein said threaded fastener is an elongated member having a hook-shaped end configured to engage said housing support bracket and includes means for attaching the casing to said fastener.

3. The auxiliary mirror module of claim 2, wherein said support bracket is a tubular rod and said hook-shaped end is configured to engage said tubular rod.

4. The auxiliary mirror module of claim 2, wherein the threaded fastener has a substantially hollow end opposite said hook-shaped end having a female threaded portion therein and said means for attaching said casing to said fastener includes a male threaded fastener adapted to project through and communicate with said casing, said male fastener matingly engagable with said female threaded portion for securing said casing to said housing support.

5. The auxiliary mirror module of claim 2, wherein the threaded fastener has a substantially solid end opposite said hook-shaped end having a male threaded portion configured to project through said casing and said means for attaching said casing to said fastener includes a female threaded fastener nut disposed on the opposite side of said casing, said nut matingly engageable with said male portion for securing said casing to said housing support.

6. An auxiliary mirror module for extending the viewing area of an automotive side view mirror of the type mounted in a housing, said housing being mounted on a support bracket configured to be attached to the exterior of a vehicle, said module comprising:

an elongated planar casing;

a pair of opposed channel sections supported on the casing, said channel sections being separated by a distance substantially equal to a dimension between opposed edges of the side view mirror housing so that the casing may be supported on said housing by sliding the channel sections over said opposed edges of the housing so that one of the ends of the casing extends laterally outward from the vehicle;

an auxiliary mirror supported on the casing at said laterally extending end so as to be supported alongside and substantially co-planar with the side view mirror housing; and a threaded fastener supported on the casing and adapted to engage said side view mirror support bracket to retain the casing relative to the side view mirror housing, said threaded fastener comprising an elongated member having a hook-shaped end configured to engage said housing support bracket and means for attaching said casing to said fastener.

7. The auxiliary mirror module of claim 6, wherein said support bracket is a tubular rod and said hook-shaped end is configured to engage said tubular rod.

8. The auxiliary mirror module of claim 6, wherein the threaded fastener has a substantially hollow end opposite said hook-shaped end having a female threaded portion therein and said means for attaching said casing to said fastener includes a male threaded fastener adapted to project through and communicate with said casing, said male fastener matingly engagable with said female threaded portion for securing said casing to said housing support.

9. The auxiliary mirror module of claim 6, wherein the threaded fastener has a substantially solid end opposite said hook-shaped end having a male threaded portion configured to project through said casing and said means for attaching said casing to said fastener includes a female threaded fastener nut disposed on the opposite side of said casing, said nut matingly engageable with said male portion for securing said casing to said housing support.

* * * * *